United States Patent
Beauford

(10) Patent No.: US 8,040,796 B2
(45) Date of Patent: Oct. 18, 2011

(54) VOICE OVER IP SYSTEM RECOVERY APPARATUS FOR SERVICE AND PACKET GROUPS BASED ON FAILURE DETECTION THRESHOLDS

(75) Inventor: Kevin D. Beauford, Chicago, IL (US)

(73) Assignee: Alcatel Lucent, Paris (FR)

( * ) Notice: Subject to any disclaimer, the term of this patent is extended or adjusted under 35 U.S.C. 154(b) by 167 days.

(21) Appl. No.: 12/221,217

(22) Filed: Jul. 31, 2008

(65) Prior Publication Data

US 2010/0027416 A1    Feb. 4, 2010

(51) Int. Cl.
*H04L 12/26* (2006.01)
*H04L 12/66* (2006.01)
*H04J 3/14* (2006.01)

(52) U.S. Cl. ......... 370/225; 370/216; 370/242; 370/352

(58) Field of Classification Search .................. 370/216, 370/225, 242, 352, 245
See application file for complete search history.

(56) References Cited

U.S. PATENT DOCUMENTS

| | | | | |
|---|---|---|---|---|
| 6,041,037 A * | 3/2000 | Nishio et al. | ................... | 370/228 |
| 6,421,529 B1 * | 7/2002 | Wing et al. | ................... | 455/67.7 |
| 6,992,974 B1 * | 1/2006 | Tripathi | ................... | 370/216 |
| 7,430,179 B2 * | 9/2008 | Towns-von Stauber et al. | ................... | 370/252 |
| 2005/0044159 A1 * | 2/2005 | Niemi et al. | ................... | 709/207 |
| 2006/0072469 A1 * | 4/2006 | Tazaki | ................... | 370/242 |
| 2006/0072593 A1 * | 4/2006 | Grippo et al. | ................... | 370/409 |
| 2006/0168319 A1 * | 7/2006 | Trossen | ................... | 709/238 |
| 2006/0203985 A1 * | 9/2006 | Beauford | ................... | 379/211.01 |
| 2006/0221838 A1 * | 10/2006 | Hartoin et al. | ................... | 370/242 |
| 2007/0153770 A1 * | 7/2007 | Goyal et al. | ................... | 370/352 |
| 2008/0098117 A1 * | 4/2008 | Fukuhara et al. | ................... | 709/227 |
| 2008/0316931 A1 * | 12/2008 | Qiu et al. | ................... | 370/245 |
| 2009/0031016 A1 * | 1/2009 | Nakai | ................... | 709/223 |
| 2009/0196183 A1 * | 8/2009 | Kakadia et al. | ................... | 370/237 |
| 2009/0245234 A1 * | 10/2009 | Parameswar et al. | ................... | 370/352 |

* cited by examiner

*Primary Examiner* — Kwang B Yao
*Assistant Examiner* — Candal Elpenord
(74) *Attorney, Agent, or Firm* — Carmen Patti Law Group, LLC

(57) ABSTRACT

A system comprising a SIP failure chandler, wherein the SIP failure handler monitors SIP failures and issues an alert and reroutes call traffic based on a service group number if a SIP failure threshold is exceeded wherein the service group number is associated with a detected failure, where the service group comprises a plurality of IP addresses.

20 Claims, 3 Drawing Sheets

VOICE OVER IP SYSTEM RECOVERY APPARATUS FOR SERVICE AND PACKET GROUPS BASED ON FAILURE DETECTION THRESHOLDS

TECHNICAL FIELD

The present invention is directed to a method and apparatus for voice over IP system recovery for service and packet groups based on failure detection thresholds.

BACKGROUND

In recent years the Internet and the Internet Protocol have played a larger role in the field of telecommunications. Packet data protocols, such as the Internet Protocol (IP), have been used to deliver packet and voice services to subscribers. Voice over IP is one example of a packet data protocol being used to deliver voice services to telecommunications subscribers. Telecommunications networks, however, must be configured to support this new paradigm of providing voice services.

In the past, an area receiving telecommunications service may receive the service through a dedicated circuit or circuit group of some type. In the wired world, this dedicated circuit may take the form of a trunk or a dedicated time-slot on a trunk. Because each call is allocated a dedicated circuit, there was a high degree of predictability of bandwidth once a circuit was allocated for a communication session. There were also a predictable number of voice circuits available once a circuit group was established. Delivering Real Time Transport Protocol (RTP) packets in a VoIP network is not as predictable. Because of the unpredictable nature of packet networks, voice calls routed over packet networks tend to be less reliable. Call failures caused by this unreliability may be more common.

In the realm of VoIP calls, an area served is typically referred to as a service group or packet group. A certain number of IP addresses may be allocated to a service group. If too many calls are routed to a service group or if a service group is experiencing technical difficulties, call failures may occur in configuring an RTP session between two IP endpoints. This type of call failure may occur before a bearer is allocated at the RTP server, which may cause call failures. If too many call failures occur, calls may need to be re-routed to a different service group. Or, if call failures are frequent, the number of IP addresses allocated to a service group may have to be modified. Thus, the number failures and types of failures occurring in a service group must be monitored.

SUMMARY

A system comprising a SIP failure tracker, wherein the SIP failure tracker monitors SIP failures and issues an alert if a SIP failure threshold is exceeded.

A method in another application, the method comprising the steps of receiving a failure message, incrementing a fail count, comparing the fail count to a failure threshold, and rerouting call traffic if the fail count exceeds the failure threshold.

DESCRIPTION OF THE DRAWINGS

Features of example implementations of the invention will become apparent from the description, the claims and the accompanying drawings in which:

DETAILED DESCRIPTION

As previously mentioned, in the arena of VoIP calls, an area may be served by a service group or packet group. There may a fixed number of Internet Protocol (IP) addresses allocated to a service group. The allocated IP addresses may be used to support communication sessions such as, voice over IP calls, or packet data services. These communication sessions may be routed through mobile switching centers and other telecommunications network components. If failures reach a certain threshold, operators may want to be informed so they may reroute calls to other service groups and/or adjust the number of IP addresses that are allocated to a service group.

Figure 1:
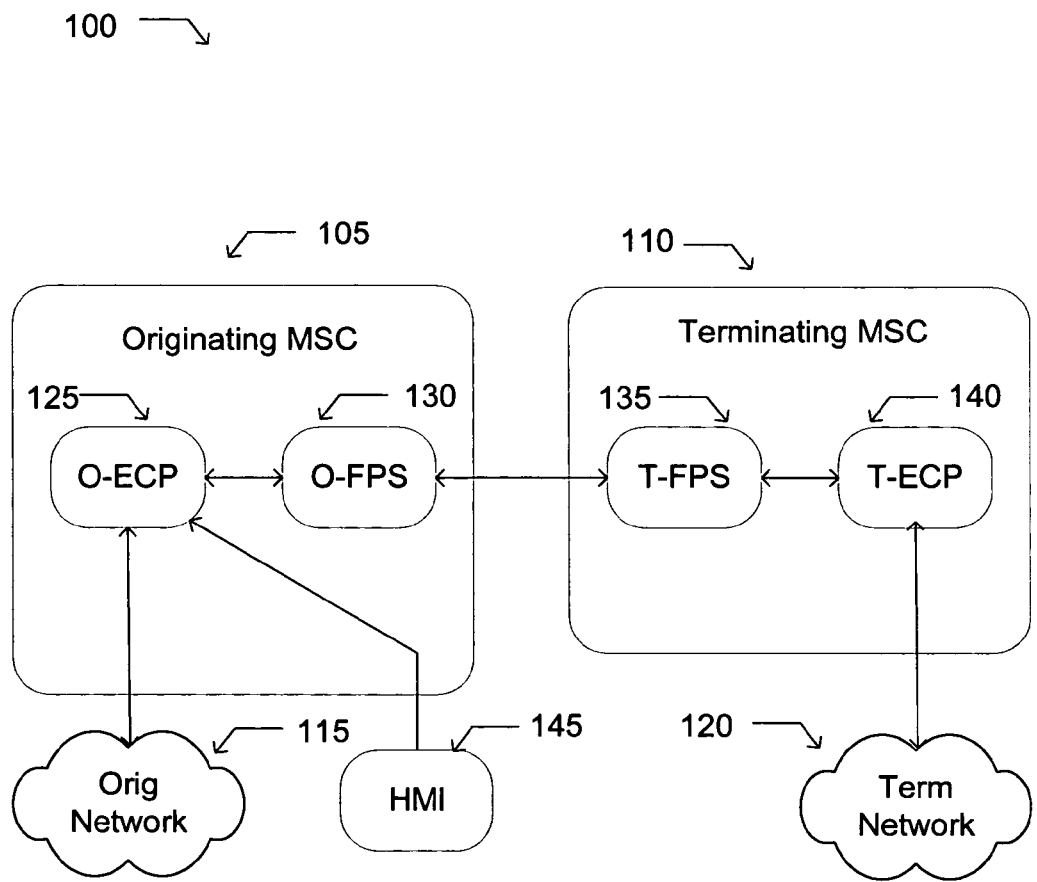
FIG. 1 is a diagram of a system in which a method and apparatus for voice over IP system recovery for service and packet groups based on failure detection thresholds may reside.

Turning to FIG. 1, which is a diagram of a system architecture where the method and apparatus for voice over IP system recovery for service and packet groups based on failure detection thresholds may reside. The network 100 may comprise an originating MSC 105, a terminating MSC 110, an originating network 115 and a terminating network 120.

The MSCs 105, 110 may be mobile switching centers (MSC), SE switches, private branch exchanges, or any other type of switching devices that may be used to connect two communication devices attempting to establish a communication session. The networks 115, 120 may be public switched telephone networks (PSTN), wireless networks, public land mobile networks (PLMN), IP multimedia subsystems (IMS), Internet Protocol networks, or any other types of networks that may be used to establish a communication session between two communication devices. A communication session may be a landline telephone call, a mobile phone call, a packet switched call, or any other means of establishing a connection between two communication devices. A communication device may be a mobile phone, a landline phone, an Internet phone, or any other equipment that may be used to establish a communication session. The communication paths between the MSCs 105, 110, and between the MSCs 105,110 and the networks 115,120 may be used for signaling as well as establishing a bearer path.

The originating MSC 105 may further comprise an originating Executive Cellular Processor (O-ECP) 125, an originating Flexent Packet Switch (O-FPS) 130, and a human machine interface (HMI) 145. Similarly, the terminating MSC 110 may further comprise a terminating FPS (T-FPS) 135 and a terminating ECP (T-ECP) 140. One of ordinary skill in the art will readily appreciate that an ECP may provide basic call processing service functions needed for packet and voice call establishment. An FPS may provide call routing services for packet calls.

The O-ECP 125 may be directly or indirectly communicatively coupled to a base site controller resident in the originating network 115. The base station controller in the originating network 115 may be in communication with a communications device. The O-ECP 125 may also be communicatively coupled to the O-FPS 130. The O-FPS 135 may be communicatively coupled to the T-FPS 135 that is communicatively coupled to the T-ECP 140. The T-ECP 140 may be directly or indirectly communicatively coupled to a base site controller resident in the terminating network 120. The base site controller in the terminating network 120 may be in communication with a communications device.

When a data call or communication session originates from the originating network 115, signaling to establish the call may be routed through the O-ECP 125 which further routes the signaling through the O-FPS 130. The O-FPS 130 may signal the T-FPS 135. Signaling between the T-FPS 135 and the T-ECP 140 may lead to the call being routed to the terminating network 120. The call may originate from a wireless network, a landline network or any other type of network capable of originating a communication session. Similarly the call may terminate on a wireless network, a landline network or any other type of network capable of terminating a communication session.

In an embodiment, an interface between the O-ECP 125 and the O-FPS 130 may be a proprietary version of IS-41. Similarly, an interface between the T-FPS 135 and the T-ECP 140 may be a proprietary version of IS-41. Although in this embodiment the interface between the O-ECP 125 and the O-FPS 130, and the T-ECP 140 and the T-FPS 135 is proprietary version of IS-41, these interfaces may be any type of interface that is supports sending or receiving messages in a network. The O-FPS 130 and the T-FPS 135 may further support a SIP interface to perform SIP signaling in the setup of SIP calls.

Typically when a SIP call is established, the O-ECP 125 sends a IS-41 setup message to the O-FPS 130. The setup message may be comprised of, among other fields, a service group (SG) number. One of ordinary skill in the art will readily appreciate that a service group and packet group are analogous to a trunk group in the circuit switched domain of telecommunications. The O-FPS 130 may translate the SG number into a packet group (PG) number. The PG number may be used to route the call. The O-FPS 130 may set a timer and send a SIP Invite message to the T-FPS 135.

In a successful scenario, SIP signaling continues until a bearer channel is established for the call, which results in an RTP session between SIP endpoints. If, for whatever reason, a bearer channel or call cannot be established, the O-FPS 130 may send a FAIL_X message to the O_ECP 125. Although in this embodiment an IS-41 FAIL_X message is sent when a call cannot be established, any type of signaling message may be sent to indicate that a call has not been completed.

Also communicatively coupled to the O-MSC 105 is the HMI 145. The HMI 145 may provide a way for an operator to communicate with and MSC. The HMI 145 may be a dumb terminal, a remote computer, or any other type of terminal that may be used to allow a human to enter commands into an MSC. The operator may use the HMI 145 to configure values of parameters that reside on the O-MSC 105. Although the HMI 145 is shown communicatively coupled to the O-MSC 105, the HMI may be communicatively coupled to any MSC or node in the network. Further, the HMI 145 may be used to set parameters that may reside in any MSC or node in the network.

Figure 2:
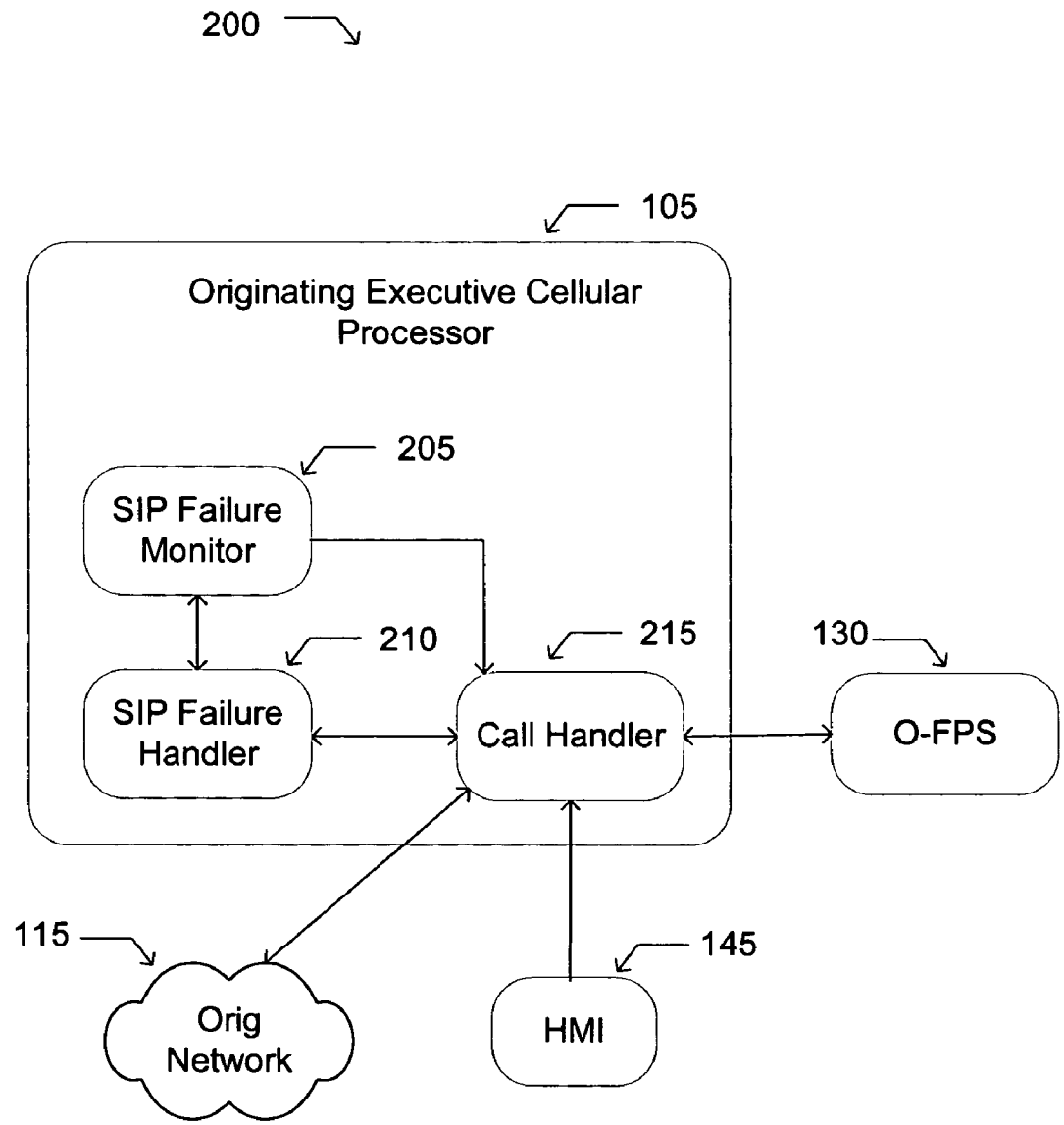
FIG. 2 is a representation of one implementation of a method and apparatus over IP system recovery apparatus for service and packet groups based on failure detection thresholds.

Turning to FIG. 2, which is a diagram of a system 200 in which an embodiment of the method and apparatus for voice over IP system recovery for service and packet groups based on failure detection thresholds may reside. The system 200 is comprised of the O-ECP 105, the originating network 115 and the O-FPS 130. The O-ECP 105 may be further comprised of a SIP failure monitor 205, a SIP failure handler 210 and a call handler 215. The SIP failure monitor 205 and the SIP failure handler 210 a SIP failure tracker. Although the SIP failure monitor 205, SIP failure handler 210 and the call handler 215 are depicted on the O-ECP 105, the SIP failure monitor 205, SIP failure handler 210 and the call handler 215 may reside on any node or be distributed throughout any number of nodes that comprise a communications network.

The call handler 215 may be communicatively coupled to the originating network 115 via the O-ECP 105. The call handler 215 may also be communicatively coupled to the O-FPS 130 via the O-ECP 105. Although the system 200 is depicted as being communicatively coupled with an O-FPS 130, the system 200 may be communicatively coupled with any type of telecommunications node or device that may be able to complete signaling to establish a voice-over IP call.

The call handler 215 may also be communicatively coupled to the SIP failure handler 210. The SIP failure handler 210 may be communicatively coupled to the call handler 215 and the SIP failure monitor 205. Further, the call handler may be communicatively coupled with the HMI 145. The SIP failure monitor 205 may be communicatively coupled with the call handler 215. The interfaces between the SIP failure monitor 205, SIP failure handler 210, call handler 215 and HMI 145 may be function calls, inter-process messaging or any other means to communicate between processes, firmware, hardware or nodes that reside in a communications network.

When a call is connected through the O-ECP 105 the call handler 215 may execute all the basic call processing function that is regularly handled by the O-ECP 105. In the process of setting up a voice over IP call, the O-ECP 105 through the call handler 215 may send an IS-41 setup message to the O-FPS 130. The setup message may comprise, among other fields, an SG, an IP address which may be used as a bearer channel, and a transaction identifier that is associated with the setup message.

The O-FPS 130 may attempt to establish a communication session by sending a SIP Invite message to the T-FPS 135. One of ordinary skill in the art will readily appreciate that a SIP Invite is a message sent to a callee to establish a voice over IP connection with the callee. When the O-FPS 130 sends the SIP Invite, the O-FPS 130 may also start a timer. If the T-FPS 135 does not respond to the SIP Invite before the timer expires, delivery of the SIP Invite is considered to have failed. When delivery of a SIP Invite message fails, the O-FPS 130 may format a FAIL_X IS-41 message that is sent to the O-ECP 105. When the O-FPS 130 sends the FAIL_X message, the FAIL_X message may comprise a service group (SG) number, a failure reason, a failure type, and a transaction identifier and other fields that may be associated with the failure of a SIP communication session. The transaction identifier is associated with the setup message sent to establish the communication session. The service group number may be the number of the service group to which the setup message was sent. A failure reason may be, for example, a SIP interworking failure, a SIP resource failure, or any other reason code that may be associated with a failed SIP Invite message. The failure type may be a failure to seize trunk, a failure to create an RTP session, SIP connectivity problem, time-out, failed translation, provisioning failure, link failure or any other reason code that may be associated with a failed call. The failure type and failure code may be fields that are added to the FAIL_X message.

When the call handler 215 receives a FAIL_X message, the call handler 215 may forward the FAIL_X message to the SIP failure handler 210. The SIP failure handler 210 may printout out the SG number, failure reason and failure type that comprises the FAIL_X message. The SIP failure handler 210 may print this information to a read only printer (ROP) that may be communicatively coupled to the O-MSC 105. The SIP failure handler 210 may then send a failure alert message to the SIP failure monitor 205 to inform the SIP failure monitor 205 that the failure has occurred. The failure alert message may comprise at least the SG number associated with the FAIL_X message.

The SIP failure monitor 205 may track or count the number of failures that have occurred for each SG by maintaining a fail count for each SG. Each SG may also have an associated failure threshold. If the fail count for an SG exceeds the failure threshold for that SG, the SIP failure monitor 205 may issue an alert by printing a message to an ROP. If the fail count for an SG exceeds the failure threshold for that SG, the SIP failure monitor 205 may also send a failure threshold alert message to the call handler 215 to inform the call handler 215 that the failure threshold associated with an SG is exceeded. The failure threshold alert message may comprise at least the SG number of the service group that has exceeded its failure threshold. Upon receipt of the failure threshold alert message, the call handler 215 may then abstain from routing incoming calls to the SG that has exceeded its associated failure threshold.

In an embodiment, the SIP failure monitor 205 keeps a fail count of each failure alert message received for an SG. Once the fail count reaches or exceeds the failure threshold, regardless of how long it takes to exceed the failure threshold, the SIP failure monitor 205 sends a failure threshold alert message to the SIP failure handler 210. This type of failure threshold may be called a hard failure threshold. For example, the failure threshold may be set at one hundred. It may take two days to meet or exceed the one hundred failure threshold, but once the failure threshold is met or exceeded the SIP failure monitor 205 may send a failure threshold alert message to the SIP failure handler 210.

In another embodiment, the fail count is cleared at regular time intervals. These regular time intervals may be called static time windows. For example, the fail count may be cleared every thirty minutes. Thus the failure threshold alert message is only sent if the failure threshold is met or exceeded during a time interval. That is, before the fail count is cleared.

In still another embodiment, a time window is maintained that is adjusted at regular intervals. This adjusted time window may be called a moving time window. If the SIP failure monitor 205 receives a failure alert message that falls outside the time window, the fail count will not reflect or count receipt of the failure alert message. For example, consider a time window that is thirty minutes wide and that is updated every minute. If a first failure alert message is received at time zero minutes when the fail count is zero, the fail count is incremented to one. If a second failure alert message is received at time ten minutes, the fail count may be incremented to two. In this example, each minute the time window is moved a minute. Assume at a thirty minute mark the fail count is still two. When the window reaches the thirty first minute, the fail count is reduced by one because the first failure alert message now falls outside the time window. The window continues to move each minute, and a failure threshold alert message is only sent if the fail count that falls within the time window equals the failure threshold. Although the size of the of the time window in this example was thirty minutes, the size of the time window may be larger or smaller than thirty minutes.

Regardless of how the fail count is maintained, in an embodiment, if the fail count exceeds the failure threshold, the fail count is not reset. Instead, once the fail count exceeds the failure threshold, the fail count remains unchanged until the operator resets the fail count. The operator may reset the fail count by entering a command via the HMI 145. In an alternative embodiment the operator does not have to reset the fail count via the HMI 145, the fail count is reset once it exceeds the failure threshold.

The system 200 in one example comprises a plurality of components such as one or more of computer software components. A number of such components can be combined or divided in the system 200. An example component of the system 200 employs and/or comprises a set and/or series of computer instructions written in or implemented with any or a number of programming languages, as will be appreciated by those skilled in the art. The system 200 in one example comprises a vertical orientation, with the description and figures herein illustrating one example orientation of the system 200, for explanatory purposes.

The system 200 in one example employs one or more computer-readable signal-bearing media. The computer-readable signal-bearing media store software, firmware and/or assembly language for performing one or more portions of one or more implementations of the invention. The computer-readable signal-bearing medium for the system 200 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Figure 3:
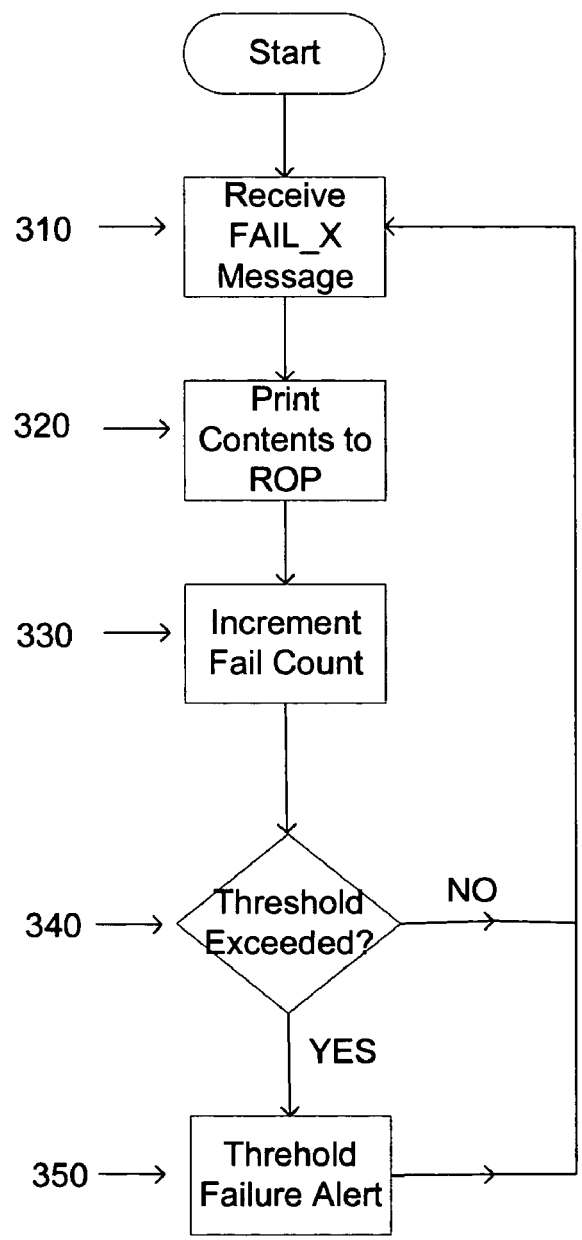
FIG. 3 is a representation of one implementation of a method and apparatus for voice over IP system recovery for service and packet groups based on failure detection thresholds.

Turning now to FIG. 3, which is a flow chart that illustrates a method and apparatus for voice over IP system recovery for service and packet groups based on failure detection thresholds. The method 300 may receive a FAIL_X message 310. The O-FPS 130 may have sent the FAIL_X message in response to a SIP Invite message time-out. The FAIL_X message may comprise at least an SG, a failure reason, and a failure type. In step 320, the method 300 may print the contents of the FAIL_X message to a ROP. This may include printing the SG associated with the FAIL_X message as well as any failure reasons or failure types associated with the FAIL_X message.

A fail count may be incremented 330. The method 300 may determine if the fail count exceeds a failure threshold 340 associated with an SG. If the fail count does not exceed the failure threshold, the method 300 returns to a state where it is ready to receive FAIL_X messages. If the fail count exceeds the failure threshold, a failure threshold alert message that is associated with a service group may be sent 350 to the call handler 215. The call handler 215 may then route calls away from the service group associated with the failure threshold alert message. In determining whether the fail count exceeds the failure threshold, the method may compare the fail count to the failure threshold in the manner described above. Thus, the method may use a hard failure threshold, a static time window or a moving time window.

The steps or operations described herein are just for example. There may be many variations to these steps or operations without departing from the spirit of the system 200 and method 300. For instance, the steps may be performed in a differing order, or steps may be added, deleted, or modified.

Although example implementations of the system 200 and method 300 have been depicted and described in detail herein, it will be apparent to those skilled in the relevant art that various modifications, additions, substitutions, and the like can be made without departing from the spirit of the method 300 and these are therefore considered to be within the scope of the system 200 and method 300 as defined in the following claims.

I claim:

1. A system comprising:

a cellular processor;
wherein the cellular processor monitors SIP failures that occur during call setup;
wherein the cellular processor issues an alert and the system reroutes call traffic based on a service group number if a failure threshold for call setups is exceeded wherein the service group number is associated with a detected call setup failure wherein the call setup failure indicates that an attempted call has not been completed;
wherein the service group number identifies a service group where a service group comprises a plurality of IP addresses that are used in support of the call setup; and
the cellular processor receives the service group number in a failure message where the service group number is the service group over which the call could not be setup, where the failure message indicates that the call failed during setup.

2. The system of claim 1, wherein the failure message is an IS-41 FAIL_X message further comprising user defined fields.

3. The system of claim 2 wherein the user defined fields further comprises at least one of a service group number, a failure reason and a failure type.

4. The system of claim 1 wherein the cellular processor increments a fail count when the cellular processor receives the failure message.

5. The system of claim 1 wherein a fail count is maintained for each service group.

6. The system of claim 5 wherein a service group has an associated failure threshold.

7. The system of claim 6 wherein if the fail count for the service group exceeds the associated failure threshold, the cellular processor reroutes calls to a service group other than the service group associated with the service group number comprising the failure message.

8. The system of claim 6 wherein the associated failure threshold is at least one of a hard failure threshold, static time window and a moving time window.

9. The system of claim 8 wherein the failure threshold is configurable through a human machine interface.

10. The system of claim 9 wherein the cellular processor routes calls to a service group when the fail count associated with the service group is cleared.

11. The system of claim 3 wherein the failure reason is at least one of a SIP interworking failure or a SIP resource failure.

12. The system of claim 3 wherein the failure type is at least one of a failure to seize a trunk, a failure to create an real-time transport protocol (RTP) session, or a SIP connectivity problem, a time-out, a failed translation, a provisioning failure, or a link failure.

13. The system of claim 1, wherein the cellular processor communicated the service group number in a call setup message, where the service group number comprises an IP address on which the call is to be setup.

14. A method of routing calls based on a service group number where the method is performed on a cellular processor comprising the steps of:
monitoring SIP failures that occur during call setup;
issuing an alert and rerouting call traffic based on a service group number if a failure threshold for call setups is exceeded wherein the service group number is associated with a detected call setup failure wherein the call setup failure indicates that an attempted call has not been completed, wherein the service group number identifies a service group where a service group comprises a plurality of IP addresses that are used in support of the call setup; and
receiving the service group number in a failure message where the service group number is the service group over which the call could not be setup, where the failure message indicates that the call failed during setup.

15. The method of claim 14 wherein the service group number identifies a service group which comprises a plurality of IP addresses that are used in support of setting up calls.

16. The method of claim 14 wherein the failure message further comprises at least one of a failure reason and a failure type;
wherein the failure reason is at least one of a SIP interworking failure or a SIP resource failure; and
wherein the failure type is at least one of a failure to seize a trunk, a failure to create a real-time transport protocol (RTP) session, or a SIP connectivity problem, a time-out, a failed translation, a provisioning failure, or a link failure.

17. The method of claim 16 wherein a fail count is compared with the failure threshold where the fail count in incremented when the failure message is received.

18. The method of claim 17 wherein the step of comparing the fail count with the failure threshold further comprises tracking the fail count on a service group basis.

19. The method of claim 18 wherein the step of comparing the fail count with the failure threshold further comprises maintaining at least one of a hard failure threshold, a static time window and a moving time window.

20. The method of claim 14, wherein the service group number is communicated in a call setup message, where the service group number comprises an IP address on which the call is to be setup.

* * * * *